United States Patent Office 3,047,358
Patented July 31, 1962

3,047,358
PREPARATION OF BORON-HYDROGEN COMPOUNDS
Herbert Jenkner, Hannover-Wulfel, Germany, assignor to Kali-Chemie Aktiengesellschaft, Hannover, Germany
No Drawing. Filed Oct. 24, 1957, Ser. No. 692,051
Claims priority, application Germany Oct. 27, 1956
3 Claims. (Cl. 23—14)

The invention relates to a method of preparing boron-containing hydrides, such as alkali metal boro-hydrides and mono-organo and di-organo substituted borines.

According to the invention, said boron-containing hydrides are obtained by reacting boron-containing chlorides in a preferably non-polar solvent or diluent with sodium hydride in the presence of a catalyst or activator comprising organo boron or organo aluminum compounds of the type recited below.

The boron halides of different halogens react differently. This applies particularly to the hydrogenation reaction here involved, where the boron chlorides show a behavior quite different from the corresponding fluorides.

In carrying out the invention, sodium hydride and a boron-chlorine compound of the formula (1)  $BCl_xR_yR'_z$ are dissolved or suspended in an inert solvent or diluent which does not decompose either reactants or reaction products. In said formula, $x$ is an integer from 1 to 3, $y$ and $z$ are integers from 0 to 2, and $x+y+z=3$; R and R' may designate the same or different monovalent organic radicals selected from the group consisting of alkyl, aryl, aralkyl, alkaryl, alkoxy and phenoxy. Suitable radicals are, for instance, methyl, methoxy, ethyl, ethoxy, propyl, propoxy, isopropyl, isopropoxy, butyl, isobutoxy, phenyl, tolyl, benzyl, and others. R and R' may also be halogen-substituted alkyl or aryl groups, or alkenyl groups. Such compounds are represented, for instance, by compounds of the following composition:

$(ClCH_2CH_2)_2BCl$; $(ClC_6H_4)_2BCl$; $(CNCH_2 \cdot CH_2)_2BCl$; $(CH_2=CH)_2BCl$ As a cheap solvent or diluent, I may use aliphatic hydrocarbons such as hexane, heptane, octane, and their iso or halogenated derivatives, or mixtures thereof in form of commercial benzines; preferably high-boiling mineral oils; aromatic hydrocarbons such as benzene, toluene, xylene and mixtures and halogenation products thereof; also alkyl silanes and similar silicon compounds; finally the obtained reaction products may also serve as solvent or suspending medium.

The catalyst or activator appears to promote the reaction by dissolving the sodium hydride or by converting the same into a soluble state. Suitable activators are compounds of the formula (2)  $MH_aR_bR'_c$ wherein $a$ is an integer from 0 to 2, $b$ and $c$ are integers from 1 to 3, and $a+b+c=3$, and M is a trivalent element of the group consisting of boron and aluminum. R and R' have the same significance as in Formula 1. As will be noted from the formula, the obtained organo substituted borines may also be used as catalyst; they form $BR_3$ for instance according to the reaction (3)  $3BRH_2 + 2NaH \rightarrow 2NaBH_4 + BR_3$ It is not necessary to add the catalyst as such, it may also be produced in situ in the reaction mixture. For instance, if the NaH suspension contains metal organic compounds like diethyl zinc, sodium ethyl, sodium ethoxide, ethyl magnesium chloride and similar compounds, whereby the ethyl and ethoxy group may be replaced by other alkyl and alkoxy groups, respectively, the subsequent addition of a reactant according to Formula 1 will produce boron compounds of the Formula 2. If said metal organic compounds have been converted to compounds of Formula 2, further added boron trichloride forms with the sodium hydride the compound $NaBH_4$; other compounds corresponding to Formula 1 react with NaH to form the corresponding organo-substituted borines.

If instead of boron compounds, aluminum compounds corresponding to Formula 2 are added, I believe that also these compounds are first converted by the boron compound (1) into a boron compound (2) so that finally it would be always the boron compound (2) which seems to act as catalyst.

The catalyst or activator should be present in amounts of .1 to 50 mol percent, calculated on the sodium hydride. Generally, amounts of 1 to 15 mol percent already produce an instantaneous reaction. Such small amounts are sufficient probably because they continue dissolving or activating fresh amounts of sodium hydride after the previously dissolved or activated sodium hydride has reacted so as to set free the catalyst for further action. The reaction proceeds in a very simple manner, for instance according to the equations (4) $BCl_3 + 4NaH \xrightarrow{catalyst} NaBH_4 + 3NaCl$ (5) $BRCl_2 + 2NaH \xrightarrow{catalyst} BRH_2 + 2NaCl$ (6) $BR_2Cl + NaH \xrightarrow{catalyst} BR_2H + NaCl$ The reaction temperature is about 50 to 150° C. The reaction is readily controlled by the rate of addition of the boron-chlorine compound. It is of advantage to use finely divided sodium hydride, particularly for small batches. Good stirring improves the rate of reaction. Generally, it is not necessary to employ superatmospheric pressures.

Instead of pure sodium hydride, mixtures thereof with other alkali metal hydrides may be used.

Particularly when $BR_3$ or $AlR_3$ are used as activators, the reaction is carried out in an atmosphere of a protective gas such as nitrogen, hydrogen or argon.

The following examples, which were carried out in nitrogen atmosphere, illustrate the invention. All parts are given by weight.

Example 1

To a suspension of 19.3 parts of sodium hydride in 300 parts of a commercially available mineral oil ($b_1$=190–220° C.), there were added dropwise with stirring at a temperature of 50 to 80° C. 65.7 parts of ethyl borochloride containing 43.5% of chlorine. Said ethyl borochloride was prepared by passing boron trichloride into triethyl borine and consisted of about 2.2 parts of diethyl boron monochloride and 1 part of ethyl boron dichloride.

In exothermic reaction, a mixture of diethyl and monoethyl borine was obtained, while sodium chloride precipitated. For completion of the eraction, the mixture was refluxed for half an hour, whereupon 35 parts (=94% of theory) of the ethyl borine mixture consisting of about 2.1 parts of diethyl and 1 part of monoethyl borine was obtained on distillation.

Example 2

Example 1 was repeated by as solvent an after-hydrogenated synthetic diesel oil boiling betwen 200 and 250° C. was used. The reaction proceeded in the same manner and the yield was about the same.

Example 3

Example 1 was repeated but instead of triethyl borine, 5 parts of triethyl aluminum were added to the mixture.

At a reaction temperature of 80–100° C., 34 parts of a mono and diethyl borine mixture were obtained.

In this case, the triethyl aluminum reacted with the added boron trichloride to form triethyl borine, whereby the also formed $AlCl_3$ was either hydrogenated at once by the NaH present or bound by NaCl to $NaAlCl_4$.

*Example 4*

To a suspension of 50 parts of sodium hydride in 200 parts of a technical mineral oil ($b_1=120-160°$ C.), there were added 5 parts of triethyl borine; then 65 parts of boron trichloride were passed into the suspension at a temperature of 105° C. The reaction started at once, and the boron trichloride was completely consumed. By separation from the mineral oil, 120 parts of a mixture of sodium chloride and sodium borohydride were obtained, the content of the latter being 16 percent. The yield, calculated on the sodium hydride, was in excess of 95 percent.

The $NaBH_4$ was readily isolated by extraction in suitable solvents, for instance by $NH_3$ under pressure at 25° C. or by isopropylamine.

*Example 5*

To a suspension of 12 parts of sodium hydride in 250 parts of a commercial mineral oil ($b_1=180-200°$ C.), there were introduced at 80° C. with stirring first 4 parts of ethyl borate and then 68 parts of diethoxy boron chloride containing 26 percent of chlorine. In exothermic reaction there were obtained 54.3 parts of chlorine-free diethoxy borine boiling between 91 and 105° C.

I claim:

1. A process for the preparation of sodium borohydride and partially organo-substituted borines, comprising reacting a chlorine containing boron compound of the formula $$BCl_x R_y R'_z$$

wherein $x$ is an integer from 1 to 3, $y$ and $z$ each are integers from 0 to 2, $x+y+z=3$, R and R' designate a monovalent organic radical selected from the group consisting of alkyl and alkoxy, in an inert anhydrous organic diluent at a temperature of about 50 to 150° C. with sodium hydride in the presence of about .1 to 50 mol percent, calculated on the sodium hydride, of a sodium hydride activating compound of the formula $$MH_a R_b R'_c$$

wherein M is an element of the group consisting of boron and aluminum, $a$ is an integer from 0 to 2, $b$ and $c$ are integers from 1 to 3, $a+b+c=3$, and R and R' have the same significance as in said chlorine containing boron compound, and isolating the obtained hydrogenated boron compound.

2. The process as defined in claim 1 wherein said chlorine containing boron compound is boron trichloride, thereby obtaining sodium borohydride.

3. The process as defined in claim 1 wherein the diluent is a mineral oil of a boiling point between about 120 and 220° C. at 1 mm. Hg.

References Cited in the file of this patent

UNITED STATES PATENTS 2,684,888     Pryde               July 27, 1954

FOREIGN PATENTS 774,728     Great Britain          May 15, 1957
1,120,200     France               Apr. 16, 1956

OTHER REFERENCES

Elliott et al.: "Journal of the American Chemical Society," vol. 74, pages 5047–5052 (1952).